(12) United States Patent
Lam et al.

(10) Patent No.: US 7,753,518 B2
(45) Date of Patent: Jul. 13, 2010

(54) EYEGLASSES AND EYEGLASS FRAMES COMPRISING GLYCOL MODIFIED COPOLYESTERS (75) Inventors: Yin Sang Lam, Hong Kong (CN); Yan Zhang, Hong Kong (CN)

(73) Assignee: Okia Optical Co., Ltd, Hong Kong (CN)

( * ) Notice: Subject to any disclaimer, the term of this patent is extended or adjusted under 35 U.S.C. 154(b) by 144 days.

(21) Appl. No.: 12/043,965

(22) Filed: Mar. 7, 2008

(65) Prior Publication Data

US 2008/0218683 A1 Sep. 11, 2008

Related U.S. Application Data (60) Provisional application No. 60/905,591, filed on Mar. 8, 2007, provisional application No. 61/026,468, filed on Feb. 5, 2008.

(51) Int. Cl.
*G02C 1/00* (2006.01)
(52) U.S. Cl. .................. 351/41; 351/110; 351/111; 351/124
(58) Field of Classification Search .............. 351/41, 351/110, 111, 124, 158
See application file for complete search history.

(56) References Cited

U.S. PATENT DOCUMENTS

| 5,292,783 | A | 3/1994 | Buchanan et al. |
|---|---|---|---|
| 5,422,685 | A | 6/1995 | Conway |
| 5,625,029 | A | 4/1997 | Hubbs et al. |
| 5,633,340 | A | 5/1997 | Hoffman et al. |
| 5,804,617 | A | 9/1998 | Hoffman et al. |
| 5,852,164 | A | 12/1998 | Akai et al. |
| 6,160,084 | A | 12/2000 | Langer et al. |
| 6,388,043 | B1 | 5/2002 | Langer et al. |
| 6,398,987 | B1 | 6/2002 | Breyne et al. |
| 6,509,094 | B1 | 1/2003 | Shah et al. |
| 6,720,402 | B2 | 4/2004 | Langer et al. |
| 7,014,315 | B2 * | 3/2006 | Iori et al. ................. 351/159 |
| 7,231,922 | B2 | 6/2007 | Davison et al. |
| 7,249,842 | B2 * | 7/2007 | Conrad et al. ............ 351/83 |
| 2003/0055198 | A1 | 3/2003 | Langer et al. |
| 2003/0144419 | A1 | 7/2003 | Hoffman et al. |
| 2004/0015187 | A1 | 1/2004 | Lendlein et al. |
| 2005/0009972 | A1 | 1/2005 | Rauh et al. |
| 2005/0185518 | A1 | 8/2005 | Kawakami et al. |
| 2005/0196636 | A1 | 9/2005 | Kawakami et al. |

(Continued)

FOREIGN PATENT DOCUMENTS

CN 2297741 Y 11/1998

(Continued)

OTHER PUBLICATIONS

ISR and WO, Jun. 12, 2008.

(Continued)

*Primary Examiner*—Hung X Dang
(74) *Attorney, Agent, or Firm*—Kam W. Law (57) ABSTRACT Disclosed herein are eyeglass frames and eyeglass frame kits made from a polymer composition comprising PCTG, and eyeglasses comprising a pair of lenses mounted on the eyeglass frames or eyeglass frame kits disclosed herein. The polymer composition disclosed herein may optionally comprise one or more additives such as colorants and fillers.

31 Claims, 4 Drawing Sheets

U.S. PATENT DOCUMENTS

| | | |
|---|---|---|
| 2006/0068206 A1 | 3/2006 | Hala et al. |
| 2006/0142524 A1 | 6/2006 | Lai et al. |
| 2006/0226565 A1 | 10/2006 | Hale et al. |
| 2006/0235167 A1 | 10/2006 | Hale et al. |
| 2006/0270806 A1 | 11/2006 | Hale et al. |
| 2006/0286384 A1 | 12/2006 | Crawford et al. |
| 2006/0287479 A1 | 12/2006 | Crawford et al. |
| 2006/0287481 A1 | 12/2006 | Crawford et al. |
| 2006/0287482 A1 | 12/2006 | Crawford et al. |
| 2006/0287484 A1 | 12/2006 | Crawford et al. |
| 2006/0287486 A1 | 12/2006 | Crawford et al. |
| 2006/0287494 A1 | 12/2006 | Crawford et al. |
| 2006/0287495 A1 | 12/2006 | Crawford et al. |
| 2006/0287496 A1 | 12/2006 | Crawford et al. |
| 2006/0293495 A1 | 12/2006 | Crawford et al. |
| 2007/0010650 A1 | 1/2007 | Crawford et al. |
| 2007/0100122 A1 | 5/2007 | Rauh et al. |
| 2007/0100125 A1 | 5/2007 | Crawford et al. |
| 2007/0105993 A1 | 5/2007 | Crawford et al. |
| 2007/0106054 A1 | 5/2007 | Crawford et al. |
| 2007/0129531 A1 | 6/2007 | Crawford et al. |

FOREIGN PATENT DOCUMENTS

| | | |
|---|---|---|
| CN | 2372698 Y | 4/2000 |
| CN | 1400485 A | 3/2003 |
| EP | 0559785 | 11/1991 |
| EP | 0648238 | 6/1993 |
| EP | 0909789 | 6/1993 |
| EP | 0694181 | 4/1994 |
| EP | 0686674 | 5/1995 |
| JP | 2001-172376 A | 6/2001 |
| WO | WO 92/09654 | 6/1992 |
| WO | WO 94/00506 | 1/1994 |
| WO | WO 94/24603 | 10/1994 |
| WO | WO 95/07032 | 3/1995 |
| WO | WO 03/004561 A2 | 1/2003 |
| WO | WO 2006/127831 | 11/2006 |
| WO | WO 2006/137954 | 12/2006 |
| WO | WO 2007/001536 | 1/2007 |
| WO | WO 2007/001542 | 1/2007 |
| WO | WO 2007/001547 | 1/2007 |
| WO | WO 2007/001548 | 1/2007 |
| WO | WO 2007/001551 | 1/2007 |
| WO | WO 2007/001552 | 1/2007 |
| WO | WO 2007/001553 | 1/2007 |
| WO | WO 2007/001557 | 1/2007 |
| WO | WO 2007/001569 | 1/2007 |
| WO | WO 2007/001571 | 1/2007 |
| WO | WO 2007/001574 | 1/2007 |
| WO | WO 2007/001575 | 1/2007 |

OTHER PUBLICATIONS

English Abstract of JP2001-172376A.
English Abstract of CN2372698Y.
English Abstract of CN2297741 Y.
English Abstract of CN1400485A.

* cited by examiner

EYEGLASSES AND EYEGLASS FRAMES COMPRISING GLYCOL MODIFIED COPOLYESTERS

PRIOR RELATED APPLICATIONS

This application claims priority to copending U.S. Provisional Patent Application Ser. Nos. 60/905,591, filed Mar. 8, 2007 and 61/026,468, filed Feb. 5, 2008, both of which are incorporated herein by reference in their entirety.

FIELD OF THE INVENTION

This invention relates to eyeglass frames and eyeglass frame kits made from a polymer composition comprising a glycol modified copolyester such as copolyesters derived from ethylene glycol, 1,4-cyclohexane dimethanol and dimethyl terephthalate or terephthalic acid (e.g., PCTG). This invention also relates to eyeglasses comprising a pair of lenses mounted on the eyeglass frames or eyeglass frame kits disclosed herein.

BACKGROUND OF THE INVENTION

Eyeglasses, glasses or spectacles generally can be used for vision correction and eye protection from hazards such as UV light or sunlight. Modern eyeglasses generally comprise a pair of lenses mounted on an eyeglass frame which can be worn in front of the wearer's eyes. The eyeglass or eyeglass frame may be supported by pads on the bridge of the nose and/or by temples placed over the ears. Eyeglass lenses can be made from glass or polymer such as polycarbonate.

Eyeglass frames are generally made from metals, wood, bone, horn, carbon fiber graphite or polymers. Semi-precious or precious stones, such as onyx, turquoise, rhinestones, diamonds and the like, may also be used as accents in frames, especially in the temples. The selection of a frame material is generally based on various properties such as density, texture, aesthetics, cost effectiveness, adjustability, safety, workability, strength, and resistances to breakage, deformation, corrosion, and heat.

A variety of metals can be used for making eyeglass frames. Some common metals used for eyeglass frames include titanium, aluminum, nickel, copper, beryllium, iron, chromium, or a combination or an alloy thereof. Some non-limiting examples of suitable metal alloys include stainless steel, nickel alloys (e.g., MONEL™), titanium alloys (e.g., TICRAL™ and FLEXON™), and aluminum alloys. Although metal eyeglass frames in general are durable, strong and corrosion-resistant, some metal frames, such as nickel alloy frames, may irritate the skin of some wearers. Furthermore, some people may be allergic to the nose pads on metal frames. Most nose pads are generally made of silicone, polyvinyl acetate, polyvinyl chloride and the like. These allergenic materials may cause a reaction on the skin of the wearers who are allergic to such materials. Therefore, there is a need for non-allergic materials such as new polymer compositions for making eyeglass frames.

Wood, bone or horn has recently gained popularity as frame materials because of their unique look and beauty. However, they are generally stiffer, less adjustable and more expensive than other frame materials. Therefore, there is a need for new frame materials such as new polymer compositions that can also provide unique look and beauty but are more flexible, more adjustable and cheaper than wood, bone or horn.

Eyeglass frames made from polymers or plastics are generally cost-effective, extremely lightweight and can be produced in a variety of colors and shapes. Some common polymers or plastics for making eyeglass frames include cellulose esters such as cellulose acetate (e.g., ZYLONITE™) or cellulose propionate, polyamides or nylons (e.g., GLIAMIDE™ and polyamide 12), polycarbonates, and blends thereof. However, the above-mentioned polymer or plastic frames may have some undesirable properties such as poor dimensional stability and low scratch resistance. For example, they may break easier than metal frames. Furthermore, they may age or degrade when exposed to heat, humidity or sunlight. Furthermore, despite the availability of a variety of polymers or plastics for making eyeglass frames, the eyeglass frame technology continues to develop to meet new trends or requirements as well as to adapt modern technologies. Therefore, there is always a need for new polymer frame materials that can provide the desirable properties of plastic frames but are resistant to breakage, heat, humidity and sunlight.

SUMMARY OF THE INVENTION

In one aspect, provided herein are eyeglass frames comprising a frame front and a pair of temples, each of the temples pivotally attached to the frame front, wherein the frame front and/or the temples are made from a polymer composition comprising a PCTG, with the proviso that the polymer composition is free of polyurethane and a cellulose ester.

In some embodiments, the eyeglass frame further comprises a pair of hinges, wherein each of the hinges connects a respective temple with the frame front. In other embodiments, the hinges are spring or normal hinges. In further embodiments, the temples are normal-hinge or spring-hinge temples. In certain embodiments, the eyeglass frame further comprises a pair of nose pads integrally attached to the frame front.

In another aspect, provided herein are eyeglass frame kits comprising a pair of temples and a pair of end pieces, each of the temples pivotally attached to each of the end pieces respectively, wherein the temples and/or the end pieces are made from a polymer composition comprising a PCTG, with the proviso that the polymer composition is free of polyurethane and a cellulose ester.

In certain embodiments, the eyeglass frame kits disclosed herein further comprise a bridge. In further embodiments, the bridge is made from a polymer composition comprising a PCTG. In other embodiments, the eyeglass frame kits disclosed herein further comprise a pair of nose pads.

In some embodiments, the eyeglass frame kits disclosed herein further comprise a pair of hinges, wherein each of the hinges connects a respective temple with the frame front. In other embodiments, the hinges are normal hinges. In further embodiments, the hinges are spring hinges. In still further embodiments, the temples of the eyeglass frame kits are spring-hinge temples. In still further embodiments, the temples of the eyeglass frame kits are normal-hinge temples.

In another aspect, provided herein are eyeglasses comprising an eyeglass frame and a pair of lenses mounted on the eyeglass frame, wherein the eyeglass frame comprises a frame front and a pair of temples, each of the temples pivotally attached to the frame front, and wherein the frame front and/or the temples are made from a polymer composition comprising a PCTG, with the proviso that the polymer composition is free of polyurethane and a cellulose ester.

In another aspect, provided herein are rimless eyeglasses comprising:

(a) a pair of integrally connected lenses;
(b) a pair of hinges, each of the hinges attached to each of the lenses respectively; and
(c) a pair of temples, each of the temples pivotally attached to each of the lenses respectively, wherein the temples are made from a polymer composition comprising a PCTC, with the proviso that the polymer composition is free of polyurethane and a cellulose ester. In some embodiments, each of the hinges comprises an end tip.

In another aspect, provided herein are rimless eyeglasses comprising:

(a) a pair of lenses;
(b) a bridge positioned between and connected to each of the lenses;
(c) a pair of end pieces, each of the end pieces attached to each of the lenses respectively; and
(d) a pair of temples, each of the temples pivotally attached to each of the end pieces respectively, wherein the temples, the end pieces and/or the bridge are made from a polymer composition comprising a PCTG polymer, with the proviso that the polymer composition is free of polyurethane and a cellulose ester.

In certain embodiments, the rimless eyeglasses disclosed herein further comprise a pair of nose pads, each of the nose pads attached to each of the lenses respectively. In further embodiments, the rimless eyeglasses further comprise a pair of nose pads attached to the bridge.

In some embodiments, the polymer compositions disclosed herein further comprise at least an additive. In further embodiments, the additive is a colorant, a UV stabilizer, a filler, a plasticizer, an antioxidant, a slip agent, an antiblocking agent, a viscosity modifier, a wax, a flow aid, a coupling agent, a crosslinking agent, a surfactant, a solvent, a flame retardant, an antistat or a combination thereof.

In certain embodiments, the polymer compositions disclosed herein further comprise a polycarbonate, a polyamide, PETG or a combination thereof. In other embodiments, the polymer composition is substantially free of a polycarbonate, a polyamide, PETG or a combination thereof.

DETAILED DESCRIPTION OF THE INVENTION

General Definitions

As used herein, "polymer" refers to a polymeric compound prepared by polymerizing monomers, whether of the same or a different type. The generic term "polymer" embraces the terms "homopolymer," "copolymer," "terpolymer" as well as "interpolymer."

As used herein, a composition that is "substantially free" of a compound or polymer refers to a composition containing less than 20 wt. %, less than 10 wt. %, less than 5 wt. %, less than 4 wt. %, less than 3 wt. %, less than 2 wt. %, less than 1 wt. %, less than 0.5 wt. %, less than 0.1 wt. %, or less than 0.01 wt. % of the compound or polymer, based on the total weight of the composition.

As used herein, a composition that is "free" of a compound or polymer refers to a composition containing 0 wt. % of the compound or polymer, based on the total weight of the composition.

As used herein, "eyeglass prescription" refers to a written order by an ophthalmologist or an optometrist to an optician for eyeglasses. It specifies the optical requirements to which the eyeglasses are to be made in order to correct blurred vision due to refractive errors, including but not limiting to myopia, hyperopia, astigmatism, and presbyopia. In some embodiments, the eyeglass prescription is determined using a phoropter or an automated refractor.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, ..., 50 percent, 51 percent, 52 percent, ..., 95 percent, 96 percent, 97 percent, 98 percent, 99 percent, or 100 percent. Moreover, any numerical range defined by two R numbers as defined in the above is also specifically disclosed.

Provided herein are eyeglass frames comprising a polymer composition wherein the eyeglass frames are generally lightweight and may have improved resistances to breakage, heat, humidity or sunlight. In some embodiments, they can be produced in a cost-effective manner and also in a variety of colors and shapes.

Also provided herein are eyeglass frames comprising a frame front and a pair of temples, each of the temples pivotally attached to the frame front, wherein the frame front and the temples are made from a polymer composition comprising a PCTG, with the proviso that the polymer composition is free of polyurethane and a cellulose ester.

Also provided herein are eyeglass frame kits comprising a pair of temples and a pair of end pieces, each of the temples pivotally attached to each of the end pieces respectively, wherein the temples and/or the end pieces are made from a polymer composition comprising a PCTG, with the proviso that the polymer composition is free of polyurethane and a cellulose ester.

Also provided herein are eyeglasses comprising an eyeglass frame and a pair of lenses mounted on the eyeglass frame, wherein the eyeglass frame comprises a frame front and a pair of temples, each of the temples pivotally attached to the frame front, and wherein the frame front and/or the temples are made from a polymer composition comprising a PCTG, with the proviso that the polymer composition is free of polyurethane and a cellulose ester.

Also provided herein are rimless eyeglasses comprising:
(a) a pair of lenses;
(b) a bridge positioned between and connected to each of the lenses;
(c) a pair of end pieces, each of the end pieces attached to each of the lenses respectively; and
(d) a pair of temples, each of the temples pivotally attached to each of the end pieces respectively, wherein the temples, the end pieces and/or the bridge are made from a polymer composition comprising a PCTG polymer, with the proviso that the polymer composition is free of polyurethane and a cellulose ester.

Polymer Compositions

The polymer compositions disclosed herein can comprise a glycol modified copolyester such as copolyesters derived from ethylene glycol, 1,4-cyclohexane dimethanol and dimethyl terephthalate or terephthalic acid (e.g., PCTG, PETG or PET-CHDM). In some embodiments, the polymer compositions disclosed herein comprise a PCTG polymer. In other embodiments, the polymer compositions disclosed herein consist essentially of a PCTG polymer. In further embodiments, the polymer compositions disclosed herein consist of a PCTG polymer. Optionally, the polymer compositions can further comprise a second polymer, an additive or a combination thereof. In some embodiments, the polymer compositions disclosed herein do not comprise or is substantially free of a second polymer. The second polymer disclosed herein refers to any polymer known to a skilled artisan except PCTG. Some non-limiting examples of the second polymer include polyurethanes, cellulose esters (e.g., cellulose acetate or cellulose propionate), a polycarbonate, a polyamide or nylon (e.g., polyamide 6, polyamide 8, polyamide 10, polyamide 11 or polyamide 12), a polyester (e.g., polyethylene terephthalate (PET), polyethylene naphthalate (PEN), poly(cyclohexanedimethylene terephthalate) (PCT), a copolyester (e.g., PET-CHDM, PETG or PCTA) or a combination thereof.

When used, the amount of the second polymer in the polymer composition disclosed herein can vary from about 1 wt. % to about 90 wt. %, from about 2.5 wt. % to about 75 wt. %, from about 5 wt. % to about 50 wt. %, from about 7.5 wt. % to about 25 wt. %, or from about 10 wt. % to about 20 wt. %, based on the total weight of the polymer composition.

The PCTG polymers used herein can be derived from ethylene glycol, 1,4-cyclohexane dimethanol and dimethyl terephthalate or terephthalic acid (TPA). The generic structure of PCTG can be represented by formula (I) as shown below.

wherein the asterisks (*) are end groups (e.g., H, OH, SH, TPA, ester or amide end group); y is from 0.5 to 0.99; and x is from 0.5 to 0.01. PCTG is distinguished from PETG or PCT by the values of x and y. For example, y is from 0.05 to 0.5 and x is from 0.95 to 0.5 for PETG; y is 1.0 and x is 0 for PCT; and y is from 0.01 to 0.05 and x is from 0.99 to 0.95 for PET-CHDM.

Any PCTG that has the above generic formula (I) can be used herein. In some embodiments, y of the PCTG polymers used herein is from 0.5 to 0.99 and x is from 0.5 to 0.01. In other embodiments, y of the PCTG polymers used herein is from 0.55 to 0.95 and x is from 0.45 to 0.05. In further embodiments, y of the PCTG polymers used herein is from 0.6 to 0.9 and x is from 0.4 to 0.1. In still further embodiments, y of the PCTG polymers used herein is from 0.65 to 0.85 and x is from 0.35 to 0.15. In still further embodiments, the sum of x and y is 1.

The end groups of formula (I) can be varied according to the requirements of the eyeglass frames disclosed herein. In some embodiments, the end groups are H, OH, TPA or a mixture thereof. In other embodiments, the OH end group can be modified by reacting with an carboxylic acid to form an ester end group. In further embodiments, the TPA end group can be modified by reacting with an alcohol or an amine to form an ester end group or an amide end group. A skilled artisan can recognize that the above-mentioned end group can be modified by any reaction or chemistry known in the literature.

The PCTG polymers used herein can have a melt index, $I_2$, from about 0.01 to about 2000 g/10 minutes, from about 0.01 to about 1000 g/10 minutes, from about 0.01 to about 500 g/10 minutes, or from about 0.01 to about 100 g/10 minutes. The melt index can be measured at a condition of 190° C./2.16 kg according to ASTM D-1238, which is incorporated herein by reference.

The PCTG polymers used herein can have a molecular weight, $M_w$, from about 1,000 g/mole to about 5,000,000 g/mole, from about 1000 g/mole to about 1,000,000, from about 10,000 g/mole to about 500,000 g/mole, or from about 10,000 g/mole to about 300,000 g/mole. The density of the PCTG polymers used herein can be from about 1.0 to about 1.4 g/cm$^3$ or from about 1.1 g/cm$^3$ to about 1.3 g/cm$^3$.

The amount of the PCTG polymer in the polymer composition disclosed herein can vary from about 60 wt. % to about 100 wt. %, from about 70 wt. % to about 99.9 wt. %, from about 80 wt. % to about 99.5 wt. %, from about 90 wt. % to about 99 wt. %, or from about 95 wt. % to about 99 wt. %, based on the total amount of the polymer composition.

In some embodiments, the polymer compositions for making the eyeglass frames disclosed herein have thermo-memory property. Thermo-memory property refers to the original shape of the eyeglass frame can be adjusted to another shape at a certain temperature (e.g., a temperature higher than the glass transition temperature (i.e., Tg) of the polymer composition), and the adjusted eyeglass frame maintains the adjusted shape after cooling down to room temperature. When the frame is heated up again, it can return to the (I)

original shape. Having this desirable property, the eyeglass frame can be easily adjusted during the fitting process to suit the different needs of various wearers. In certain embodiments, the Tg of the polymer composition is from about 40° C. to about 140° C., from about 45° C. to about 120° C., from about 50° C. to about 110° C., from about 55° C. to about 100° C., from about 60° C. to about 90° C., from about 65° C. to about 85° C. In further embodiments, the Tg of the polymer composition is from about 70° C. to about 80° C.

In certain embodiments, the polymer compositions for making the eyeglass frames disclosed herein are dimensionally stable. The dimension of the eyeglass frames can stably be kept even though the frame has been produced or used for a long period of time.

In other embodiments, the polymer compositions for making the eyeglass frames disclosed herein have good thermal stability and toughness. The shape and dimensional stability of the eyeglass frames can be kept even though the eyeglass frames are subjected to a temperature higher than about 60° C. or higher than about 70° C. for more than about 2 days or more than about 7 days.

Additives

Optionally, the polymer compositions disclosed herein can comprise at least one additive for the purposes of improving and/or controlling the processibility, appearance, physical, chemical, and/or mechanical properties of the polymer compositions. In some embodiments, the polymer compositions do not comprise an additive. Any plastics additive known to a person of ordinary skill in the art may be used in the polymer compositions disclosed herein. Non-limiting examples of suitable additives include colorants or pigments, UV stabilizers, plasticizers, antioxidants, fillers, lubricants, antifogging agents, flow aids, coupling agents, cross-linking agents, nucleating agents, surfactants, slip agents, anti-blocking agents, solvents, flame retardants, antistatic agents, and combinations thereof. The total amount of the additives can range from about greater than 0 to about 80 wt. %, from about 0.001 wt. % to about 70 wt. %, from about 0.01 wt. % to about 60 wt. %, from about 0.1 wt. % to about 50 wt. %, from about 1 wt. % to about 40 wt. %, or from about 10 wt. % to about 50 wt. % of the total weight of the polymer composition. Some polymer additives have been described in Zweifel Hans et al., "*Plastics Additives Handbook*," Hanser Gardner Publications, Cincinnati, Ohio, 5th edition (2001), which is incorporated herein by reference in its entirety.

In further embodiments, the polymer compositions disclosed herein optionally comprise a colorant or pigment that can change the look of the polymer compositions to human eyes. Any colorant or pigment known to a person of ordinary skill in the art may be added to the polymer compositions disclosed herein. Non-limiting examples of suitable colorants or pigments include inorganic pigments such as metal oxides such as iron oxide, zinc oxide, and titanium dioxide, mixed metal oxides, carbon black, organic pigments such as anthraquinones, anthanthrones, azo and monoazo compounds, arylamides, benzimidazolones, BONA lakes, diketopyrrolo-pyrroles, dioxazines, disazo compounds, diarylide compounds, flavanthrones, indanthrones, isoindolinones, isomidolines, metal complexes, monoazo salts, naphthols, b-naphthols, naphthol AS, naphthol lakes, perylenes, perinones, phthalocyanines, pyranthrones, quinacridones, and quinophthalones, and combinations thereof. Where used, the amount of the colorant or pigment in the polymer composition can be from about greater than 0 to about 10 wt %, from about 0.1 to about 5 wt %, or from about 0.25 to about 2 wt % of the total weight of the polymer composition. Some colorants have been described in Zweifel Hans et al., "*Plastics Additives Handbook*," Hanser Gardner Publications, Cincinnati, Ohio, 5th edition, Chapter 15, pages 813-882 (2001), which is incorporated herein by reference.

Optionally, the polymer compositions disclosed herein can comprise a filler which can be used to adjust, inter alia, volume, weight, costs, and/or technical performance. Any filler known to a person of ordinary skill in the art may be added to the polymer compositions disclosed herein. Non-limiting examples of suitable fillers include talc, calcium carbonate, chalk, calcium sulfate, clay, kaolin, silica, glass, fumed silica, mica, wollastonite, feldspar, aluminum silicate, calcium silicate, alumina, hydrated alumina such as alumina trihydrate, glass microsphere, ceramic microsphere, thermoplastic microsphere, barite, wood flour, glass fibers, carbon fibers, marble dust, cement dust, magnesium oxide, magnesium hydroxide, antimony oxide, zinc oxide, barium sulfate, titanium dioxide, titanates and combinations thereof. In some embodiments, the filler is barium sulfate, talc, calcium carbonate, silica, glass, glass fiber, alumina, titanium dioxide, or a mixture thereof. In other embodiments, the filler is talc, calcium carbonate, barium sulfate, glass fiber or a mixture thereof. Where used, the amount of the filler in the polymer composition can be from about greater than 0 to about 80 wt %, from about 0.1 to about 60 wt %, from about 0.5 to about 40 wt %, from about 1 to about 30 wt %, or from about 10 to about 40 wt % of the total weight of the polymer composition. Some fillers have been disclosed in U.S. Pat. No. 6,103,803 and Zweifel Hans et al., "*Plastics Additives Handbook*," Hanser Gardner Publications, Cincinnati, Ohio, 5th edition, Chapter 17, pages 901-948 (2001), both of which are incorporated herein by reference.

In other embodiments, the polymer compositions disclosed herein optionally comprise an UV stabilizer that may prevent or reduce the degradation of the polymer compositions by UV radiations. Any UV stabilizer known to a person of ordinary skill in the art may be added to the polymer compositions disclosed herein. Non-limiting examples of suitable UV stabilizers include benzophenones, benzotriazoles, aryl esters, oxanilides, acrylic esters, formamidines, carbon black, hindered amines, nickel quenchers, hindered amines, phenolic antioxidants, metallic salts, zinc compounds and combinations thereof. Where used, the amount of the UV stabilizer in the polymer composition can be from about greater than 0 to about 5 wt %, from about 0.01 to about 3 wt %, from about 0.1 to about 2 wt %, or from about 0.1 to about 1 wt % of the total weight of the polymer composition. Some UV stabilizers have been described in Zweifel Hans et al., "*Plastics Additives Handbook*," Hanser Gardner Publications, Cincinnati, Ohio, 5th edition, Chapter 2, pages 141-426 (2001), which is incorporated herein by reference.

Optionally, the polymer compositions disclosed herein can comprise a plasticizer. In general, a plasticizer is a chemical that can increase the flexibility and lower the glass transition temperature of polymers. Any plasticizer known to a person of ordinary skill in the art may be added to the polymer compositions disclosed herein. Non-limiting examples of plasticizers include mineral oils, abietates, adipates, alkyl sulfonates, azelates, benzoates, chlorinated paraffins, citrates, epoxides, glycol ethers and their esters, glutarates, hydrocarbon oils, isobutyrates, oleates, pentaerythritol derivatives, phosphates, phthalates, esters, polybutenes, ricinoleates, sebacates, sulfonamides, tri- and pyromellitates, biphenyl derivatives, stearates, difuran diesters, fluorine-containing plasticizers, hydroxybenzoic acid esters, isocyanate adducts, multi-ring aromatic compounds, natural product derivatives, nitrites, siloxane-based plasticizers, tar-based products, thioethers and combinations thereof. Where used, the amount of the plasticizer in the polymer composition can be from greater than 0 to about 15 wt %, from about 0.5 to about 10 wt %, or from about 1 to about 5 wt % of the total weight of the polymer composition. Some plasticizers have been described in George Wypych, "*Handbook of Plasticizers*," ChemTec Publishing, Toronto-Scarborough, Ontario (2004), which is incorporated herein by reference.

In some embodiments, the polymer compositions disclosed herein optionally comprise an antioxidant that can prevent the oxidation of polymer components and organic additives in the polymer compositions. Any antioxidant known to a person of ordinary skill in the art may be added to the polymer compositions disclosed herein. Non-limiting examples of suitable antioxidants include aromatic or hindered amines such as alkyl diphenylamines, phenyl-α-naphthylamine, alkyl or aralkyl substituted phenyl-α-naphthylamine, alkylated p-phenylene diamines, tetramethyl-diaminodiphenylamine and the like; phenols such as 2,6-di-t-butyl-4-methylphenol; 1,3,5-trimethyl-2,4,6-tris(3',5'-di-t-butyl-4'-hydroxybenzyl)benzene; tetrakis[(methylene(3,5-di-t-butyl-4-hydroxyhydrocinnamate)]methane (e.g., IRGANOX™ 1010, from Ciba Geigy, New York); acryloyl modified phenols; octadecyl-3,5-di-t-butyl-4-hydroxycinnamate (e.g., IRGANOX™ 1076, commercially available from Ciba Geigy); phosphites and phosphonites; hydroxylamines; benzofuranone derivatives; and combinations thereof. Where used, the amount of the antioxidant in the polymer composition can be from about greater than 0 to about 5 wt %, from about 0.0001 to about 2.5 wt %, from about 0.001 to about 1 wt %, or from about 0.001 to about 0.5 wt % of the total weight of the polymer composition. Some antioxidants have been described in Zweifel Hans et al., "*Plastics Additives Handbook*," Hanser Gardner Publications, Cincinnati, Ohio, 5th edition, Chapter 1, pages 1-140 (2001), which is incorporated herein by reference.

Optionally, the polymer compositions disclosed herein can comprise a lubricant. In general, the lubricant can be used, inter alia, to modify the rheology of the molten polymer compositions, to improve the surface finish of molded articles, and/or to facilitate the dispersion of fillers or pigments. Any lubricant known to a person of ordinary skill in the art may be added to the polymer compositions disclosed herein. Non-limiting examples of suitable lubricants include fatty alcohols and their dicarboxylic acid esters, fatty acid esters of short-chain alcohols, fatty acids, fatty acid amides, metal soaps, oligomeric fatty acid esters, fatty acid esters of long-chain alcohols, montan waxes, polyethylene waxes, polypropylene waxes, natural and synthetic paraffin waxes, fluoropolymers and combinations thereof. Where used, the amount of the lubricant in the polymer composition can be from about greater than 0 to about 5 wt %, from about 0.1 to about 4 wt %, or from about 0.1 to about 3 wt % of the total weight of the polymer composition. Some suitable lubricants have been disclosed in Zweifel Hans et al., "*Plastics Additives Handbook*," Hanser Gardner Publications, Cincinnati, Ohio, 5th edition, Chapter 5, pages 511-552 (2001), both of which are incorporated herein by reference.

Optionally, the polymer compositions disclosed herein can comprise an antistatic agent. Generally, the antistatic agent can increase the conductivity of the polymer compositions and to prevent static charge accumulation. Any antistatic agent known to a person of ordinary skill in the art may be added to the polymer compositions disclosed herein. Non-limiting examples of suitable antistatic agents include conductive fillers (e.g., carbon black, metal particles and other conductive particles), fatty acid esters (e.g., glycerol monostearate), ethoxylated alkylamines, diethanolamides, ethoxylated alcohols, arylsulfonates, alkylphosphates, quaternary ammonium salts, alkylbetaines and combinations thereof. Where used, the amount of the antistatic agent in the polymer composition can be from about greater than 0 to about 5 wt %, from about 0.01 to about 3 wt %, or from about 0.1 to about 2 wt % of the total weight of the polymer composition. Some suitable antistatic agents have been disclosed in Zweifel Hans et al., "*Plastics Additives Handbook*," Hanser Gardner Publications, Cincinnati, Ohio, 5th edition, Chapter 10, pages 627-646 (2001), both of which are incorporated herein by reference.

In some embodiments, the polymer compositions disclosed herein comprise a slip agent. In other embodiments, the polymer compositions disclosed herein do not comprise a slip agent. Slip is the sliding of film surfaces over each other or over some other substrates. The slip performance of films can be measured by ASTM D 1894, *Static and Kinetic Coefficients of Friction of Plastic Film and Sheeting*, which is incorporated herein by reference. In general, the slip agent can convey slip properties by modifying the surface properties of films; and reducing the friction between layers of the films and between the films and other surfaces with which they come into contact.

Any slip agent known to a person of ordinary skill in the art may be added to the polymer compositions disclosed herein. Non-limiting examples of the slip agents include primary amides having about 12 to about 40 carbon atoms (e.g., erucamide, oleamide, stearamide and behenamide); secondary amides having about 18 to about 80 carbon atoms (e.g., stearyl erucamide, behenyl erucamide, methyl erucamide and ethyl erucamide); secondary-bis-amides having about 18 to about 80 carbon atoms (e.g., ethylene-bis-stearamide and ethylene-bis-oleamide); and combinations thereof.

In some embodiments, the slip agent is a primary amide with a saturated aliphatic group having between 18 and about 40 carbon atoms (e.g., stearamide and behenamide). In other embodiments, the slip agent is a primary amide with an unsaturated aliphatic group containing at least one carbon-carbon double bond and between 18 and about 40 carbon atoms (e.g., erucamide and oleamide). In further embodiments, the slip agent is a primary amide having at least 20 carbon atoms. In further embodiments, the slip agent is erucamide, oleamide, stearamide, behenamide, ethylene-bis-stearamide, ethylene-bis-oleamide, stearyl erucamide, behenyl erucamide or a combination thereof. In a particular embodiment, the slip agent is erucamide. In further embodiments, the slip agent is commercially available having a trade name such as ATMER™ SA from Uniqema, Everberg, Belgium; ARMOSLIP® from Akzo Nobel Polymer Chemicals, Chicago, Ill.; KEMAMIDE® from Witco, Greenwich, Conn.; and CRODAMIDE® from Croda, Edison, N.J. Where used, the amount of the slip agent in the polymer composition can be from about greater than 0 to about 3 wt %, from about 0.0001 to about 2 wt %, from about 0.001 to about 1 wt %, from about 0.001 to about 0.5 wt % or from about 0.05 to about 0.25 wt % of the total weight of the polymer composition. Some slip agents have been described in Zweifel Hans et al., "*Plastics Additives Handbook*," Hanser Gardner Publications, Cincinnati, Ohio, 5th edition, Chapter 8, pages 601-608 (2001), which is incorporated herein by reference.

Optionally, the polymer compositions disclosed herein can comprise an anti-blocking agent. In some embodiments, the polymer compositions disclosed herein do not comprise an anti-blocking agent. The anti-blocking agent can be used to prevent the undesirable adhesion between touching layers of articles made from the polymer compositions, particularly under moderate pressure and heat during storage, manufacture or use. Any anti-blocking agent known to a person of ordinary skill in the art may be added to the polymer compositions disclosed herein. Non-limiting examples of anti-blocking agents include minerals (e.g., clays, chalk, and calcium carbonate), synthetic silica gel (e.g., SYLOBLOC® from Grace Davison, Columbia, Md.), natural silica (e.g., SUPER FLOSS® from Celite Corporation, Santa Barbara, Calif.), talc (e.g., OPTIBLOC® from Luzenac, Centennial, Colo.), zeolites (e.g., SIPERNAT® from Degussa, Parsippany, N.J.), aluminosilicates (e.g., SILTON® from Mizusawa Industrial Chemicals, Tokyo, Japan), limestone (e.g., CARBOREX® from Omya, Atlanta, Ga.), spherical polymeric particles (e.g., EPOSTAR®, poly(methyl methacrylate) particles from Nippon Shokubai, Tokyo, Japan and TOSPEARL®, silicone particles from GE Silicones, Wilton, Conn.), waxes, amides (e.g. erucamide, oleamide, stearamide, behenamide, ethylene-bis-stearamide, ethylene-bis-oleamide, stearyl erucamide and other slip agents), molecular sieves, and combinations thereof. The mineral particles can lower blocking by creating a physical gap between articles, while the organic anti-blocking agents can migrate to the surface to limit surface adhesion. Where used, the amount of the anti-blocking agent in the polymer composition can be from about greater than 0 to about 3 wt %, from about 0.0001 to about 2 wt %, from about 0.001 to about 1 wt %, or from about 0.001 to about 0.5 wt % of the total weight of the polymer composition. Some anti-blocking agents have been described in Zweifel Hans et al., "*Plastics Additives Handbook*," Hanser Gardner Publications, Cincinnati, Ohio, 5th edition, Chapter 7, pages 585-600 (2001), which is incorporated herein by reference.

In further embodiments, the polymer compositions disclosed herein optionally comprise a cross-linking agent that can be used to increase the cross-linking density of the polymer compositions. Any cross-linking agent known to a person of ordinary skill in the art may be added to the polymer compositions disclosed herein. Non-limiting examples of suitable cross-linking agents include organic peroxides (e.g., alkyl peroxides, aryl peroxides, peroxyesters, peroxycarbonates, diacylperoxides, peroxyketals, and cyclic peroxides) and silanes (e.g., vinyltrimethoxysilane, vinyltriethoxysilane, vinyltris(2-methoxyethoxy)silane, vinyltriacetoxysilane, vinylmethyldimethoxysilane, and 3-methacryloyloxypropyltrimethoxysilane). Where used, the amount of the cross-linking agent in the polymer composition can be from about greater than 0 to about 20 wt %, from about 0.1 to about 15 wt %, or from about 1 to about 10 wt % of the total weight of the polymer composition. Some suitable cross-linking agents have been disclosed in Zweifel Hans et al., "*Plastics Additives Handbook*," Hanser Gardner Publications, Cincinnati, Ohio, 5th edition, Chapter 14, pages 725-812 (2001), both of which are incorporated herein by reference.

The cross-linking of the polymer compositions can also be initiated by any radiation means known in the art, including, but not limited to, electron-beam irradiation, beta irradiation, gamma irradiation, corona irradiation, and UV radiation with or without cross-linking catalyst. U.S. patent application Ser. No. 10/086,057 (published as US2002/0132923 A1) and U.S. Pat. No. 6,803,014 disclose electron-beam irradiation methods that can be used in embodiments of the invention.

Crosslinking can be promoted with a crosslinking catalyst, and any catalyst that will provide this function can be used. Suitable catalysts generally include organic bases, carboxylic acids, and organometallic compounds including organic titanates and complexes or carboxylates of lead, cobalt, iron, nickel, zinc and tin. Dibutyltindilaurate, dioctyltinmaleate, dibutyltindiacetate, dibutyltindioctoate, stannous acetate, stannous octoate, lead naphthenate, zinc caprylate, cobalt naphthenate; and the like. Tin carboxylate, especially dibutyltindilaurate and dioctyltinmaleate, are particularly effective for this invention. The catalyst (or mixture of catalysts) is present in a catalytic amount, typically between about 0.015 and about 0.035 phr.

Preparation of the Polymer Compositions

The ingredients of the polymer compositions, e.g., the PCTG polymer, the optional second polymer and additives, can be mixed or blended using methods known to a person of ordinary skill in the art, preferably methods that can provide a substantially homogeneous distribution of the optional second polymer and additives in the PCTG polymer. Non-limiting examples of suitable blending methods include melt blending, solvent blending, extruding, and the like.

In some embodiments, the ingredients of the polymer compositions are melt blended by a method as described by Guerin et al. in U.S. Pat. No. 4,152,189. First, all solvents, if there are any, are removed from the ingredients by heating to an appropriate elevated temperature of about 100° C. to about 200° C. or about 150° C. to about 175° C. at a pressure of about 5 torr (667 Pa) to about 10 torr (1333 Pa). Next, the ingredients are weighed into a vessel in the desired proportions and the polymer composition is formed by heating the contents of the vessel to a molten state while stirring.

In other embodiments, the ingredients of the polymer compositions are processed using solvent blending. First, the ingredients of the desired polymer composition are dissolved in a suitable solvent and the mixture is then mixed or blended. Next, the solvent is removed to provide the polymer composition.

In further embodiments, physical blending devices that provide dispersive mixing, distributive mixing, or a combination of dispersive and distributive mixing can be useful in preparing homogenous blends. Both batch and continuous methods of physical blending can be used. Non-limiting examples of batch methods include those methods using BRABENDER® mixing equipments (e.g., BRABENDER PREP CENTER®, available from C. W. Brabender Instruments, Inc., South Hackensack, N.J.) or BANBURY® internal mixing and roll milling (available from Farrel Company, Ansonia, Conn.) equipment. Non-limiting examples of continuous methods include single screw extruding, twin screw extruding, disk extruding, reciprocating single screw extruding, and pin barrel single screw extruding. In some embodiments, the additives can be added into an extruder through a feed hopper or feed throat during the extrusion of the polymer composition. The mixing or blending of polymers by extrusion has been described in C. Rauwendaal, "*Polymer Extrusion*", Hanser Publishers, New York, N.Y., pages 322-334 (1986), which is incorporated herein by reference.

When one or more additives are required in the polymer compositions, the desired amounts of the additives can be added in one charge or multiple charges to the PCTG polymer or the polymer composition. Furthermore, the addition can take place in any order. In some embodiments, the additives are first added and mixed or blended with the PCTG polymer and then the additive-containing PCTG polymer is blended with the second polymer. In other embodiments, the additives are first added and mixed or blended with the PCTG polymer and then the additive-containing PCTG polymer is blended with the second polymer. In further embodiments, the PCTG polymer is blended with the second polymer first and then the additives are blended with the polymer composition. Polymer compositions can also be performed at the fabrication equipment as dry blends (no pre-compounding required).

Alternatively, master batches containing high concentrations of the additives can be used. In general, master batches can be prepared by blending either the PCTG polymer, the optional second polymer or the polymer composition with high concentrations of additives. The master batches can have additive concentrations from about 1 wt. % to about 50 wt. %, from about 1 wt. % to about 40 wt. %, from about 1 wt. % to about 30 wt. %, or from about 1 wt. % to about 20 wt. % of the total weight of the polymer composition. The master batches can then be added to the polymer compositions in an amount determined to provide the desired additive concentrations in the end products. In some embodiments, the master batch contains a UV stabilizer, a colorant or pigment, a filler, a plasticizer, an antioxidant, a slip agent, an anti-blocking agent, a lubricant, an antifogging agent, a flow aid, a coupling agent, a cross-linking agent, a nucleating agent, a surfactant, a solvent, a flame retardant, an antistatic agent, or a combination thereof. In other embodiment, the master batch contains a UV stabilizer, a colorant or pigment, a filler or a combination thereof. In other embodiment, the master batch contains at least one colorant.

Applications of the Polymer Compositions

The polymer compositions disclosed herein can be used to prepare the eyeglass frames disclosed herein. The eyeglass frames may be, inter alia, prescription eyeglass frames, non-prescription eyeglass frames, protective glass frames and the like. The prescription eyeglasses can be used to treat, inter alia, myopia, hyperopia, astigmatism, and presbyopia. The protective glass frames can be used to protected against hazards such as toxic gases, dusts, chemicals, lasers, X-rays, UV light, sunlight or the like. Some non-limiting examples of suitable protective glass frames include sunglass frames, safety glass frames, laser protection eyewear frames and the like. When lenses of the eyeglasses are plano lenses, the frames are referred as nonprescription eyeglasses.

Figure 1:
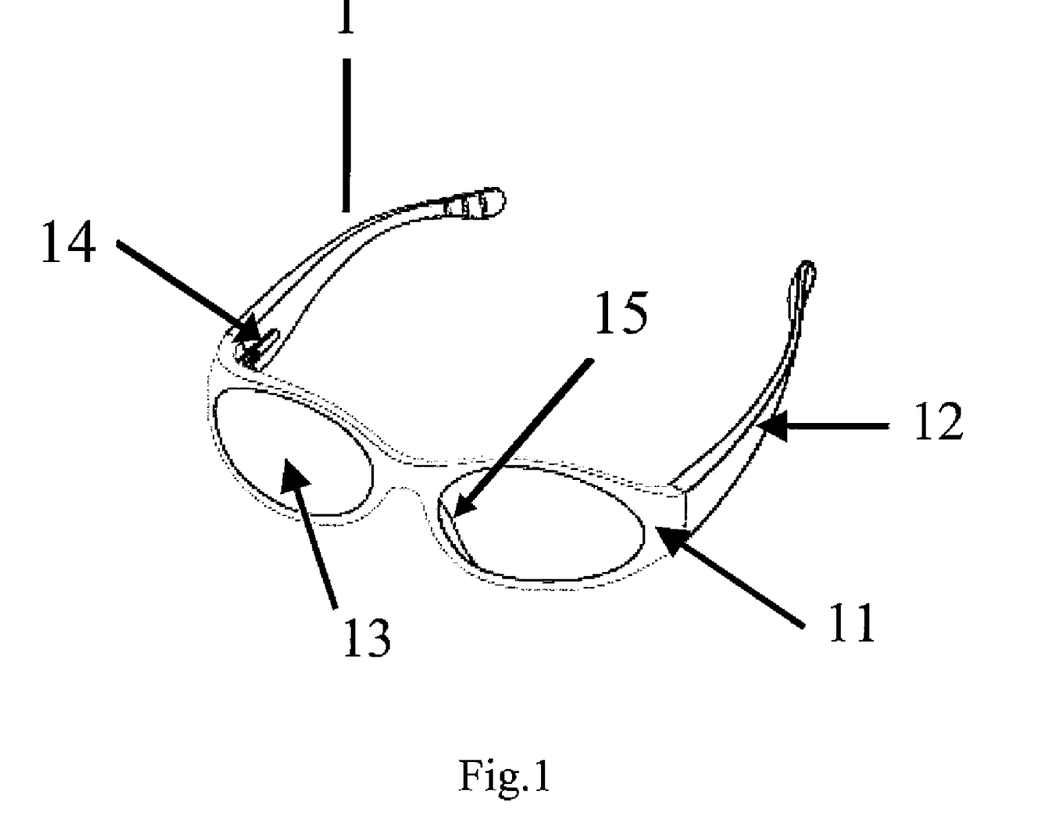
FIG. 1 depicts an elevated view of a full-rim eyeglass (1) containing a pair of lenses (13) mounted on an embodiment of the eyeglass frames disclosed herein. The eyeglass frame comprises a full-rim frame front (11), a pair of temples (12), a pair of hinges (14) and a pair of nose pads (15).

The eyeglass frames disclosed herein can be full-rim frames, semi-rimless frames, rimless frames or any other styles known to skilled artisans. Some embodiments of the eyeglass frames disclosed herein are depicted in FIGS. 1-4. FIG. 1 shows an embodiment of the full-rim eyeglasses disclosed herein. The full-rim eyeglass (1) contains a pair of lenses (13) mounted on a full-rim eyeglass frame. The full-rim eyeglass frame comprises a full-rim frame front (11), a pair of temples (12), a pair of hinges (14) pivotally connected the temples (12) to the full-rim frame front (11), and a pair of nose pads (15) integrally attached to the full-rim frame front (11).

Figure 2:
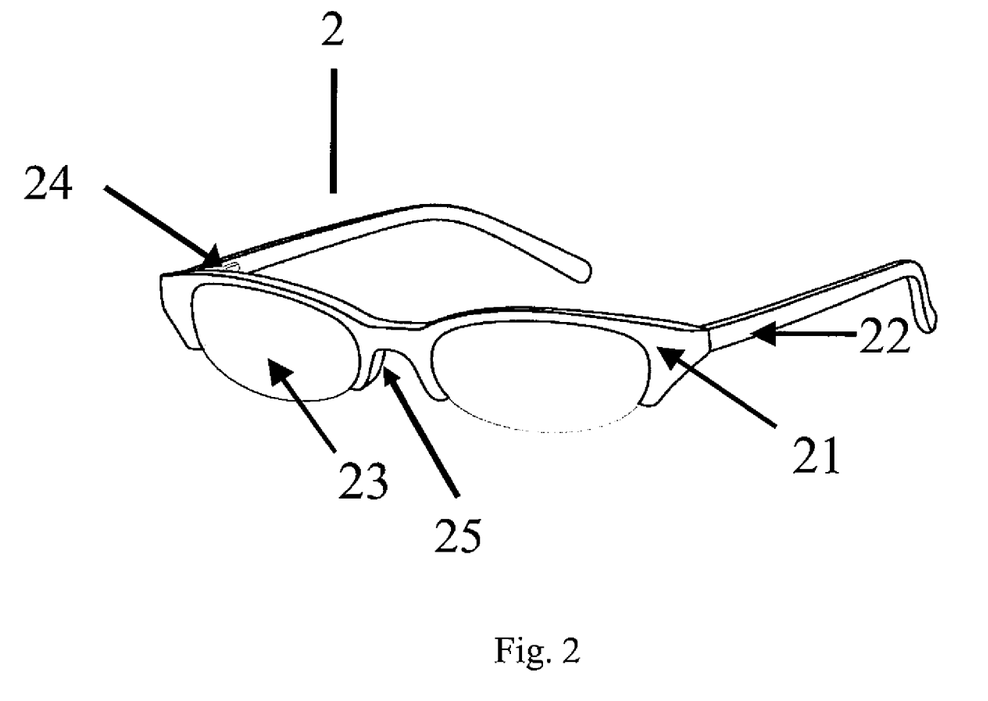
FIG. 2 depicts an elevated view of a semi-rimless eyeglass (2) containing a pair of lenses (23) mounted on another embodiment of the eyeglass frames disclosed herein. The eyeglass frame comprises a semi-rimless frame front (21), a pair of temples (22), a pair of hinges (24) and a pair of nose pads (25).

FIG. 2 shows an embodiment of the semi-rimless eyeglasses disclosed herein. The semi-rimless eyeglass (2) contains a pair of lenses (23) mounted on a semi-rimless eyeglass frame. The semi-rimless eyeglass frame comprises a semi-rimless frame front (21), a pair of temples (22), a pair of hinges (24) pivotally connected the temples (22) to the semi-rimless frame front (21), and a pair of nose pads (25) integrally attached to the semi-rimless frame front (21).

Figure 3:
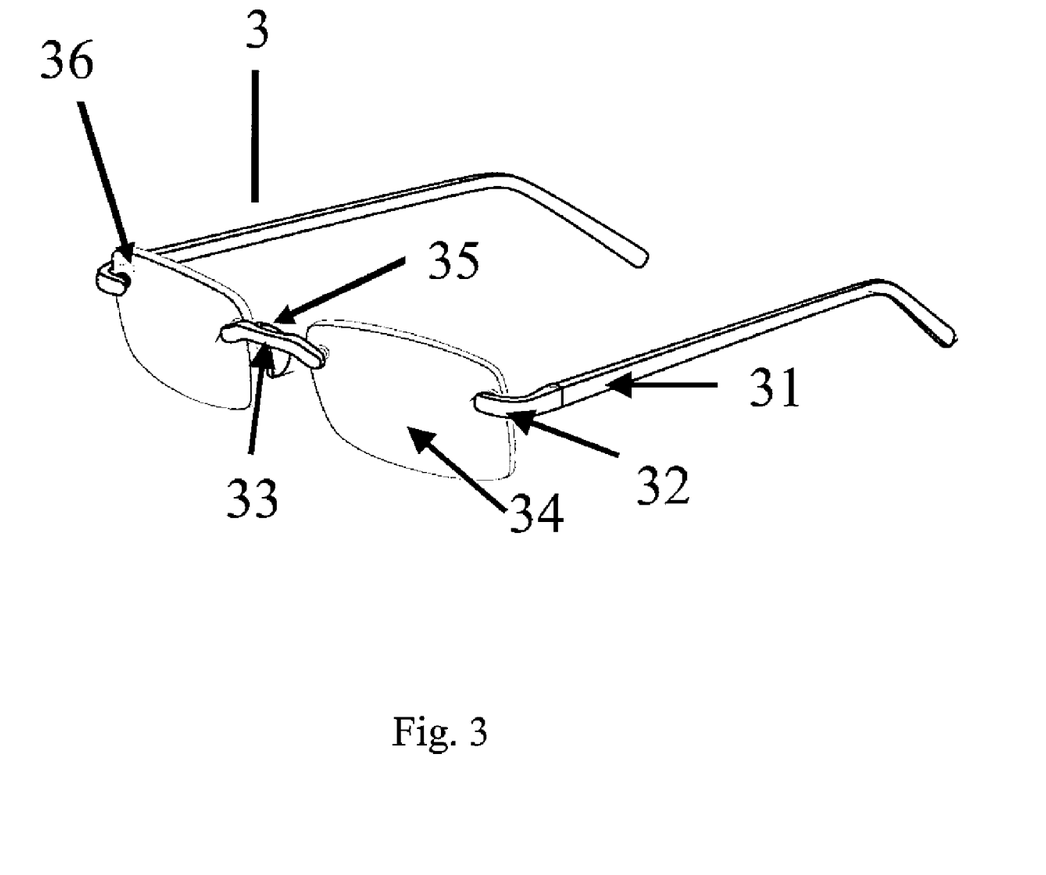
FIG. 3 depicts an elevated view of a rimless eyeglass (3) containing a pair of lenses (34) mounted on an embodiment of rimless eyeglass frames disclosed herein. The rimless eyeglass frame comprises a bridge (33), a pair of end pieces (32), a pair of temples (31), a pair of hinges (36) and a pair of nose pads (35).

FIG. 3 shows an embodiment of the rimless eyeglasses disclosed herein. The rimless eyeglass (3) contains a pair of lenses (34) mounted on a rimless eyeglass frame. The rimless eyeglass frame comprises a bridge (33) connecting the lenses (34), a pair of end pieces (32), a pair of temples (31), a pair of hinges (36) and a pair of nose pads (35). Each of the end pieces (32) is attached to the lenses (34) respectively and each of the temples (31) is attached to the end pieces (32) respectively.

Figure 4:
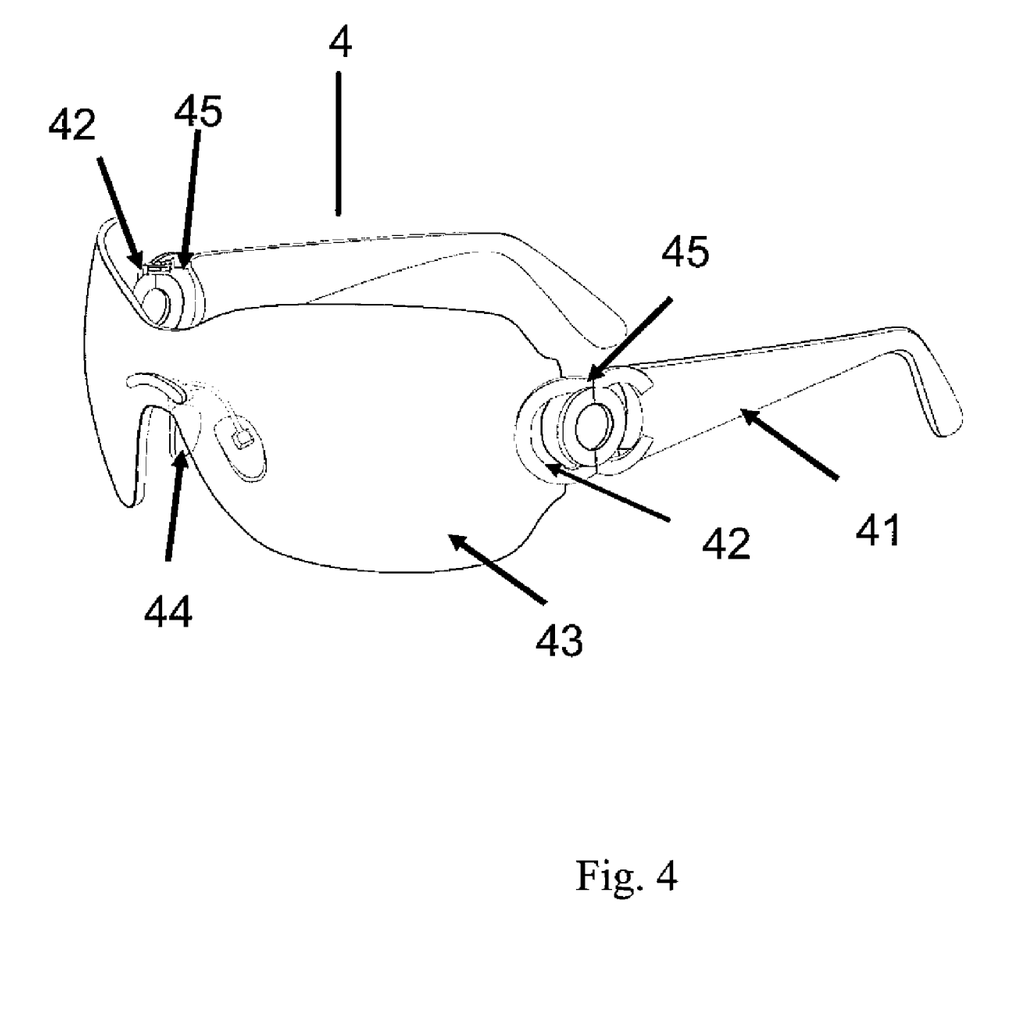
FIG. 4 depicts an elevated view of a rimless eyeglass (4) containing a pair of integrally connected lenses (43) mounted. The rimless eyeglass frame comprises a pair of temples (41), a pair of nose pads (44), and a pair of hinges (45). Each of the hinges (45) comprises an end tip (42).

FIG. 4 shows another embodiment of the rimless eyeglasses disclosed herein. The rimless eyeglass (4) contains a pair of integrally connected lenses (43) and a pair of temples (41), a pair of hinges (45) and a pair of nose pads (44). Each of the hinges (45) connects the respective temple (41) to the lenses (43). In this embodiments, each of the hinges comprises a pair of end tips (42) which engage respectively the temple (41) and the lenses (43).

The lenses of the eyeglasses disclosed herein can be made from or of any conventional lens material known to skilled artisans. For examples, the lenses can be made from or of a variety of glasses or polymers. In some embodiments, the lense material comprises or is a glass. Any glass which is suitable for making lenses can be used as a lense material herein. Some non-limiting examples of suitable glasses include silica-based glasses, germanates (glasses based on $GeO_2$), tellurites (glasses based on $TeO_2$), antimonates (glasses based on $Sb_2O_3$), arsenates (glasses based on $As_2O_3$), titanates (glasses based on $TiO_2$), tantalates (glasses based on $Ta_2O_5$) and combinations thereof. In some embodiments, the lense material is a silica-based glass. Some non-limiting examples of suitable silica-based glasses include crown glass and flint glass.

In some embodiments, the lense material comprises or is a polymer, plastic or resin. Any plastic which is suitable for making lenses can be used as a tense material herein. Some non-limiting examples of suitable plastics include polyalkyl acrylates, polyalkyl methacrylates such as polymethyl methacrylate (e.g., PLEXIGLAS™, LIMACRYL™, R-CAST™, PERSPEX™, PLAZCRYL™, ACRYLEX™, ACRYLITE™, ACRYLPLAST™, ALTUGLAS™, POLYCAST™ and LUCITE™), polycarbonates, resins (e.g., CR-39™ or allyl diglycol carbonate), polyurethanes and combinations thereof.

The lenses of the eyeglasses disclosed herein can be coated with one or more coatings such as anti-scratch, anti-UV and anti-reflective coatings. Further, the lenses of some eyeglasses disclosed herein such as sunglasses can be tinted with colors. The color of the lenses can vary by style, fashion, and purpose. In certain embodiments, the color of the lenses can be green, grey, yellow, or brown.

In some embodiments, the lenses of the eyeglasses disclosed herein are coated with an anti-scratch coating. Any anti-scratch coating which is suitable for protecting optical lenses from scratches can be used herein. Some non-limiting examples of suitable anti-scratch coatings include UV cure hardcoats, silicone-based hardcoats and acrylic hardcoats.

In certain embodiments, the lenses of the eyeglasses disclosed herein are coated with an anti-UV coating. Any anti-UV coating or UV protective coating which is suitable for screen out UV light can be used herein. Some non-limiting examples of suitable anti-UV coating methods are tinting, polarizing, grading and mirroring.

In other embodiments, the lenses of the eyeglasses disclosed herein are coated with an anti-reflective coating. Any anti-refractive coating which is suitable for reducing reflection can be used herein. Some non-limiting examples of suitable anti-refractive coatings are low-index silica or natural nanostructured films.

In some embodiments, the lenses are prescription or corrective lenses for modifying the focal length of the eye to alleviate the effects of nearsightedness (myopia), farsightedness (hyperopia) or astigmatism.

In certain embodiments, the eyeglasses are safety glasses made with shatter-resistant plastic lenses to protect the eye from flying debris. The lense may have a minimum thickness of 1 millimeter at the thinnest point, regardless of material.

Safety glasses can vary in the level of protection they provide. For example, those used in medicine may be expected to protect against blood splatter while safety glasses in a factory might have stronger lenses and a stronger frame with additional shields at the temples. The lenses of safety glasses can also be shaped for correction.

Some safety glasses are designed to fit over corrective glasses or sunglasses. They may provide less eye protection than goggles or other forms of eye protection, but their light weight increases the likelihood that they will actually be used. Recent safety glasses have tended to be given a more stylish design, in order to encourage their use. The pictured wraparound safety glasses are evidence of this style change with the close fitting nature of the wraparound dispensing with the need for side shields. Corrective glasses with plastic lenses can be used in the place of safety glasses in many environments; this is one advantage that they have over contact lenses.

There are also safety glasses for welding, which are styled like wraparound sunglasses, but with much darker lenses, for use in welding where a full sized welding helmet is inconvenient or uncomfortable. These are often called "flash goggles", because they provide protection from welding flash.

In certain embodiments, the eyeglasses are sunglasses. Sunglasses may be made with either prescription or non-prescription lenses that are darkened to provide protection against bright visible and possibly ultraviolet light.

Glasses with photosensitive lenses, called photochromic lenses, become darker in the presence of UV light. Unfortunately, many car windshields block the passage of UV light, making photochromic lenses less effective whilst driving on bright days. Still, they offer the convenience of not having to carry both clear glasses and sunglasses to those who frequently go indoors and outdoors during the course of a day.

Light polarization is an added feature that can be applied to sunglass lenses. Polarization filters remove horizontal rays of light, which can cause glare. Popular among fishermen and hunters, polarized sunglasses allow wearers to see into water when normally glare or reflected light would be seen. Polarized sunglasses may present some difficulties for pilots since reflections from water and other structures often used to gauge altitude may be removed, or instrument readings on liquid crystal displays may be blocked.

Yellow lenses are commonly used by golfers and shooters for their contrast enhancement and depth perception properties. Brown lenses are also common among golfers, but cause color distortion. In some embodiments, the In certain embodiments, the can be blue, purple, and green for cosmetic purposes. Some sunglasses with interchangeable lenses have optional clear lenses to protect the eyes during low light or night time activities and a colored lens with UV protection for times where sun protection is needed.

In certain embodiments, the eyeglasses disclosed herein are 3D eyeglasses. 3D eyeglasses may create the illusion of three dimensions when viewing specially prepared 2D images. The classic 3D eyeglasses may have one red lens and one blue lens. Some 3D eyeglasses uses polarized filters, with one lens polarized vertically and the other horizontally, with the two images required for stereo vision polarized the same way.

In certain embodiments, the eyeglasses disclosed herein comprises multiple-focus lenses such as bifocal or trifocal lenses. Traditional multifocal lenses have two or three distinct viewing areas, each requiring a conscious effort of refocusing. Some modern multifocal lenses, such as progressive lenses, give a smooth transition between these different focal points.

In certain embodiments, the eyeglasses disclosed herein are three-piece rimless or semi-rimless eyeglasses. Three-piece rimless glasses generally have no frame around the lenses, and the bridge and temples are mounted directly onto the lenses. Semi-rimless (or half-rimless) glasses have a frame that only partially encircles the lenses (generally at the top portion).

The polymer compositions can be used to prepare the eyeglasses disclosed herein with known polymer processes such as extrusion (e.g., sheet extrusion and profile extrusion), injection molding, molding, and rotational molding. In general, extrusion is a process by which a polymer is propelled continuously along a screw through regions of high temperature and pressure where it is melted and compacted, and finally forced through a die. The extruder can be a single screw extruder, a multiple screw extruder, a disk extruder or a ram extruder. The die can be profile extrusion die. The extrusion of polymers has been described in C. Rauwendaal, "*Polymer Extrusion*", Hanser Publishers, New York, N.Y. (1986); and M. J. Stevens, "*Extruder Principals and Operation*," Ellsevier Applied Science Publishers, New York, N.Y. (1985), both of which are incorporated herein by reference in their entirety.

Injection molding is also widely used for manufacturing a variety of plastic parts for various applications. In general, injection molding is a process by which a polymer is melted and injected at high pressure into a mold, which is the inverse of the desired shape, to form parts of the desired shape and size. The mold can be made from metal, such as steel and aluminum. The injection molding of polymers has been described in Beaumont et al., "*Successful Injection Molding: Process, Design, and Simulation*," Hanser Gardner Publications, Cincinnati, Ohio (2002), which is incorporated herein by reference in its entirety.

Molding is generally a process by which a polymer is melted and led into a mold, which is the inverse of the desired shape, to form parts of the desired shape and size. Molding can be pressureless or pressure-assisted. The molding of polymers is described in Hans-Georg Elias "*An Introduction to Plastics*," Wiley-VCH, Weinhei, Germany, pp. 161-165 (2003), which is incorporated herein by reference.

Rotational molding is a process generally used for producing hollow plastic products. By using additional post-molding operations, complex components can be produced as effectively as other molding and extrusion techniques. Rotational molding differs from other processing methods in that the heating, melting, shaping, and cooling stages all occur after the polymer is placed in the mold, therefore no external pressure is is applied during forming. The rotational molding of polymers has been described in Glenn Beall, "*Rotational Molding: Design, Materials & Processing*," Hanser Gardner Publications, Cincinnati, Ohio (1998), which is incorporated herein by reference in its entirety.

The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

EXAMPLES

Examples 1-10

Some non-limiting examples of suitable polymer compositions for making eyeglass frames disclosed herein are shown below:

(a) a polymer composition comprising 100% PETG, referring as Example 1 in Table 1.
(b) a polymer composition comprising 100% PCTG, referring as Example 2 in Table 1.
(c) polymer compositions comprising a polycarbonate (PC) and PETG. The ratios of PC:PETG are about 1.5:8.5 and about 1:9 respectively for Examples 3 and 4 in Table 1.
(d) polymer compositions comprising a polycarbonate (PC) and PCTG. The ratios of PC:PCTG are about 1:9 and about 0.5:9.5 respectively for Examples 5 and 6 in Table 1.
(e) a polymer composition comprising polyamide 12 (PA12), PC and PETG blends. The ratio of PA12:PC:PETG is about 1:1.5:7.5, referring as Example 7 in Table 1.
(f) a polymer composition comprising polyamide 12 (PA12), PC and PCTG blends. The ratio of PA12:PC:PCTG is about 1:1:8, referring as Example 8 in Table 1.
(g) a polymer composition comprising cellulose propionate (CP), PC and PETG. The ratio of CP:PC:PETG is about 1.5:1:10, referring as Example 9 in Table 1.
(h) a polymer composition comprising CP, PC and PETG. The ratio of CP:PC:PETG is about 1:2:17, referring as Example 10 in Table 1.

The polymer compositions and additives such as colorant or pigment should be sufficiently dried so as to prevent the hydrolytic degradation during processing. The CP, PC, PA12, PETG, PCTG or blends thereof were dried by a dehumidified dryer at about 70° C. to about 100° C. for about 2 hours to about 10 hours. Examples 1-10 were prepared by using one or more of PC, PA12, PETG, PCTG and CP according to the formulations as shown in Table 1 below.

TABLE 1

The amounts (in parts) of polymers used for preparing Examples 1-10.

| | Examples | | | | | | | | | |
|---|---|---|---|---|---|---|---|---|---|---|
| Component | 1 | 2 | 3 | 4 | 5 | 6 | 7 | 8 | 9 | 10 |
| PC | | | 1.5 | 1 | 1 | 0.5 | 1.5 | 1 | 1 | 2 |
| PA-12 | | | | | | | 1 | 1 | | |
| PETG | 10 | | 8.5 | 9 | | | 7.5 | | 10 | |
| PCTG | | 10 | | | 9 | 9.5 | | 8 | | 17 |
| CP | | | | | | | | | 1.5 | 1 |

Examples 1-10 were processed by the processing parameters listed below.

Injection: The injection machine, JM128 MKIII-C from Chen Hsong Holdings Limited, HK, was applied to produce the eyeglass frames disclosed herein. The zone temperatures of injection machine was set at about 230-270° C. and the mold was kept at about 20-70° C.

Extrusion: The eyeglass frames disclosed herein was also produced by extrusion. The extruder, GY-ZS-PP from Guangzhou Guoyan Industry Develop Co., Ltd., China, was applied to produce the eyeglass frames disclosed herein. The barrel temperature was set at about 230-270° C. and the mold temperature may be set at about 200-220° C.

After injection or extrusion, the eyeglass frames may be treated to obtain desirable surface quality such as desirable gloss and crystal effects. Tumbling and polishing process may also be used. Lacquer, coating and painting was applied for fashion purposes as required.

In some embodiments, the glass transition temperature of the polymer composition disclosed herein is from about 70° C. to about 99.9° C.

Mechanical and Physical Properties Measurements

The hardness, compression set properties, flexural modulus, heat distortion temperature, ultimate elongation, ultimate tensile strength and yield strength of Examples 1-10 can be measured according to the following methods.

The Shore D hardness of each sample can be measured according to ASTM D 2240, which is incorporated herein by reference.

The compression set properties of each sample at 23° C. and 70° C. can be measured according to ASTM D 4703.

The flexural modulus of each sample can be measured according to the method described in ASTM D 790, which is incorporated herein by reference.

The heat distortion temperature or deflection temperature of each sample can be measured according to the method described in ASTM D648, which is incorporated herein by reference.

The ultimate tensile strength, ultimate elongation and yield strength of each sample can be measured according to ASTM D 638, which is incorporated herein by reference.

Examples 2, 4, 5, 6 and 8 were tested for Shore D hardness, flexural modulus, heat distortion temperature, ultimate tensile strength, ultimate elongation and yield strength according to the methods disclosed herein. The test results of Examples 2, 4, 5, 6 and 8 are shown in Table 2 below. An Instron 5567 Universal Materials Testing Machine (commercially available from Instron, Norwood, Mass., USA) was used for measuring flexural modulus, ultimate tensile strength, ultimate elongation and yield strength.

TABLE 2

| | Examples | | | | |
|---|---|---|---|---|---|
| Properties | 2 | 4 | 5 | 6 | 8 |
| Shore D Hardness | 72 | 65 | 66 | 72 | 65 |
| Flexural modulus (MPa) | 1800 | 1900 | 1900 | 1900 | 2050 |
| Heat distortion temperature (° C.) | 74 | / | / | / | / |
| Ultimate elongation (%) | 340 | 135 | 134 | 153 | 80 |
| Ultimate tensile strength (MPa) | 52 | 56 | 53 | 52 | 50 |
| Yield strength (MPa) | 44 | 56 | 56 | 58 | 54 |

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. Finally, any number disclosed herein should be construed to mean approximate, regardless of whether the word "about" or "approximately" is used in describing the number. The appended claims intend to cover all those modifications and variations as falling within the scope of the invention.

What is claimed is:

1. An eyeglass frame comprising a frame front and a pair of temples, each of the temples pivotally attached to the frame front, wherein at least one of the frame front and the temples is made from a polymer composition comprising a PCTG, with the proviso that the polymer composition is free of a polyurethane and a cellulose ester.

2. The eyeglass frame of claim 1 further comprising a pair of hinges, wherein each of the hinges connects a respective temple with the frame front.

3. The eyeglass frame of claim 2, wherein the hinges are spring hinges or normal hinges.

4. The eyeglass frame of claim 1, wherein the temples are normal-hinge temple or spring-hinge temples.

5. The eyeglass frame of claim 1, wherein the frame front is made from the polymer composition and wherein the eyeglass frame further comprises a pair of nose pads attached to the frame front.

6. The eyeglass frame of claim 5, wherein the frame front and the nose pads are made from the polymer composition and wherein the nose pads are integrally attached to the frame front.

7. The eyeglass frame of claim 1, wherein the temples are made from the polymer composition and a metal is encapsulated with the polymer composition for each of the temples.

8. The eyeglass frame of claim 1, wherein the polymer composition further comprises at least an additive comprising a colorant, a UV stabilizer, a filler, a plasticizer, an antioxidant, a slip agent, an antiblocking agent, a viscosity modifier, a wax, a flow aid, a coupling agent, a crosslinking agent, a surfactant, a solvent, a flame retardant or an antistat.

9. The eyeglass frame of claim 1, wherein the polymer composition further comprises a polycarbonate, a polyamide, PETG or a combination thereof.

10. The eyeglass frame of claim 1, wherein the polymer composition is free of polycarbonate.

11. An eyeglass frame kit comprising a pair of temples wherein at least one of the temples is made from a polymer composition comprising a PCTG, with the proviso that the polymer composition is free of polyurethane and a cellulose ester.

12. The eyeglass frame kit of claim 11 further comprising a pair of end pieces, wherein each of the temples is pivotally attached to each of the end pieces respectively.

13. The eyeglass frame kit of claim 11 further comprising a bridge.

14. The eyeglass frame kit of claim 11 further comprising a pair of nose pads.

15. The eyeglass frame kit of claim 11, wherein the polymer composition further comprises a polycarbonate, a polyamide, PETG or a combination thereof 16. The eyeglass frame kit of claim 11, wherein the polymer composition is free of polycarbonate.

17. An eyeglass comprising an eyeglass frame and a pair of lenses mounted on the eyeglass frame, wherein the eyeglass frame comprises a frame front and a pair of temples, each of the temples pivotally attached to the frame front, and wherein at least one of the frame front and the temples is made from a polymer composition comprising a PCTG, with the proviso that the polymer composition is free of polyurethane and a cellulose ester.

18. The eyeglass of claim 17 further comprising a pair of hinges, wherein each of the hinges connects a respective temple with the frame front.

19. The eyeglass of claim 17, wherein the eyeglass frame further comprises a pair of nose pads attached to the frame front.

20. The eyeglass of claim 17, wherein the polymer composition further comprises a polycarbonate, a polyamide, PETG or a combination thereof.

21. The eyeglass of claim 17, wherein the polymer composition is free of polycarbonate.

22. A rimless eyeglass comprising:
(a) a pair of integrally connected lenses;
(b) a pair of temples; and
(c) a pair of hinges, each of the hinges connects one of the temples to one of the lenses respectively,
wherein the temples are made from a polymer composition comprising a PCTG, with the proviso that the polymer composition is free of polyurethane and a cellulose ester.

23. The rimless eyeglass of claim 22 further comprising a pair of nose pads, the nose pads attached to the pair of integrally connected lenses.

24. The eyeglass of claim 22, wherein each of the hinges comprises a pair of end tips.

25. The rimless eyeglass of claim 22, wherein the polymer composition further comprises a polycarbonate, a polyamide, PETG or a combination thereof.

26. The rimless eyeglass of claim 22, wherein the polymer composition is free of polycarbonate.

27. A rimless eyeglass comprising:
(a) a pair of lenses;
(b) a bridge positioned between and connected to each of the lenses;
(c) a pair of end pieces, each of the end pieces attached to each of the lenses respectively; and
(d) a pair of temples, each of the temples pivotally attached to each of the end pieces respectively,
wherein at least one of the temples, the end pieces and the bridge is made from a polymer composition comprising a PCTG, with the proviso that the polymer composition is free of polyurethane and a cellulose ester.

28. The rimless eyeglass of claim 27 further comprising a pair of nose pads, each of the nose pads attached to each of the lenses respectively.

29. The rimless eyeglass of claim 27 further comprising a pair of nose pads attached to the bridge.

30. The rimless eyeglass of claim 27, wherein the polymer composition further comprises a polycarbonate, a polyamide, PETG or a combination thereof.

31. The rimless eyeglass of claim 27, wherein the polymer composition is free of polycarbonate.

* * * * *